US007716480B2

(12) United States Patent
Ghosh

(10) Patent No.: US 7,716,480 B2
(45) Date of Patent: May 11, 2010

(54) PROPERTY-BASED DATA AUTHENTICATION MECHANISM

(75) Inventor: Subhas Kumar Ghosh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1297 days.

(21) Appl. No.: 11/183,293

(22) Filed: Jul. 15, 2005

(65) Prior Publication Data

US 2007/0014411 A1 Jan. 18, 2007

(51) Int. Cl.
*H04L 9/32* (2006.01)
*G06F 7/04* (2006.01)
*G06F 17/30* (2006.01)
*B41K 3/38* (2006.01)
*H04K 1/00* (2006.01)

(52) U.S. Cl. .......................... 713/170; 726/2; 380/255; 380/59

(58) Field of Classification Search ........................ None
See application file for complete search history.

(56) References Cited

U.S. PATENT DOCUMENTS 5,491,749 A * 2/1996 Rogaway .................... 713/171

6,128,737 A * 10/2000 Jakubowski et al. ........ 713/181
6,170,061 B1 * 1/2001 Beser ............................ 726/3

OTHER PUBLICATIONS

Haller, "The S/Key One-Time Password System", "Proceedings of the Symposium on Network and Distributed Systems Security", Feb. 1994, pp. 151-157, Publisher: Internet Society.
Lamport, "Password Authentication With Insecure Communication", "Communications of the ACM", Nov. 1981, pp. 770-772, vol. 24, No. 11, Publisher: ACM.
Perrig et al., "The Tesla Broadcast Authentication Protocol", "RSA Cryptobytes", 2002, pp. 2-13, vol. 5, No. 2, Publisher: RSA Laboritories.
Perrig et al., "SPINS: Security Protocols for Sensor Networks", "Wireless Networks", 2002, pp. 521-534, vol. 8, Publisher: Kluwer Academic Publishers, Published in: The Netherlands.

* cited by examiner

*Primary Examiner*—Nasser Moazzami
*Assistant Examiner*—Oscar A Louie
(74) *Attorney, Agent, or Firm*—Fogg & Powers LLC

(57) ABSTRACT

In one embodiment, a network comprises a plurality of nodes that communicate with one another. A first node included in the plurality of nodes generates a plan comprising a plurality of marker states. Each marker state comprises a value for a property associated with the first node. When the first node broadcasts information indicative of a given marker state included in the plan, at least one node other than the first node verifies the value of the property included in the given marker state.

18 Claims, 9 Drawing Sheets

//patents
PROPERTY-BASED DATA AUTHENTICATION MECHANISM

TECHNICAL FIELD

The following description relates to communication technology in general and to cryptographic communication technology in particular.

BACKGROUND

In many communication applications, when a node (also referred to here as the "transmitting" node) transmits data to ones or more "receiving" nodes in the network, each of a receiving nodes needs to determine if the data received by that node is the same data that was transmitted by the transmitting node. If that is the case, the receiving node uses the received data in processing performed by that node.

Also, in some applications, even if such a receiving node determines that data received by that node is authentic (that is, is the same data transmitted by the transmitting node), the receiving node needs a mechanism to determine if the transmitting node is "cheating" and transmitting "incorrect" data. In one such application, at least a portion of the data transmitted by the transmitting node is contextual information associated with the transmitting node (for example, a current temperature and location for the transmitting node at the time the transmitting node transmits the data). In such an application, if the transmitting cheats and transmits incorrect contextual information, the processing performed by the receiving node using such information may generate incorrect or otherwise undesirable results.

SUMMARY

In one embodiment, a network comprises a plurality of nodes that communicate with one another. A first node included in the plurality of nodes generates a plan comprising a plurality of marker states. Each marker state comprises a value for a property associated with the first node. When the first node broadcasts information indicative of a given marker state included in the plan, at least one node other than the first node verifies the value of the property included in the given marker state.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
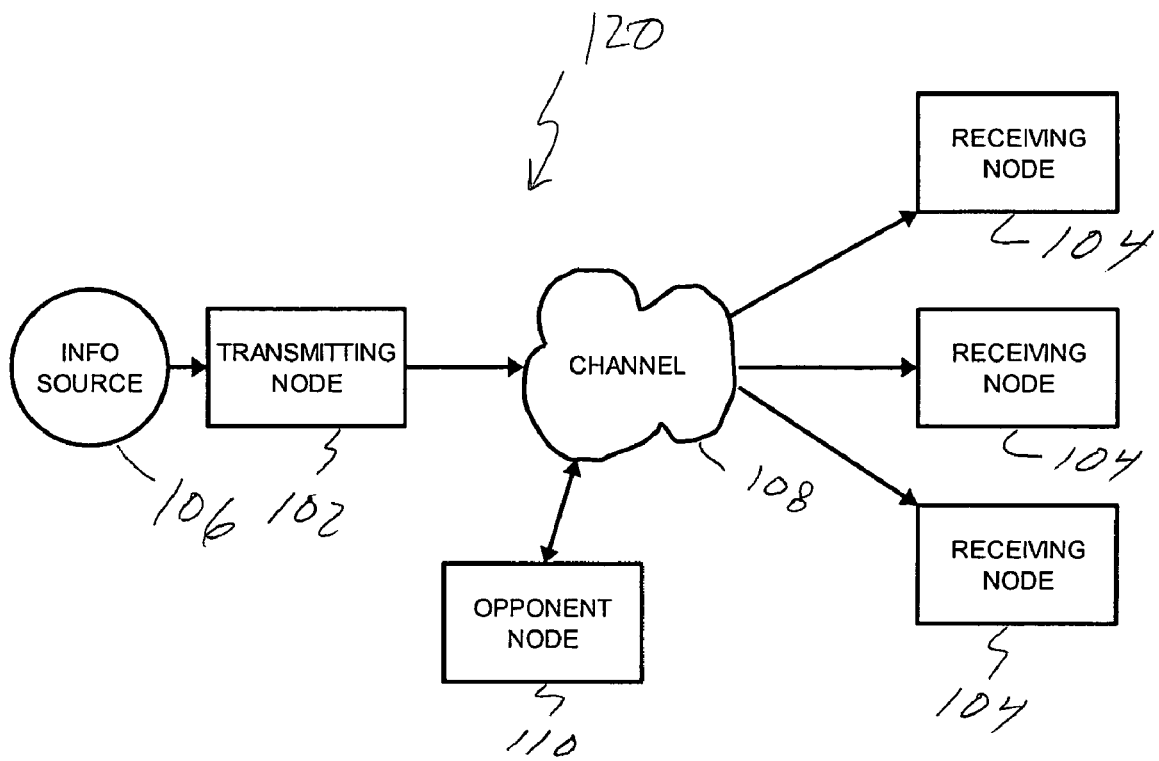
FIG. 1 is a block diagram illustrating one example where a transmitting node transmits data to one or more receiving nodes in a network.

FIG. 1 is a block diagram illustrating one example where a transmitting node 102 transmits data to one or more receiving nodes 104 in a network 120. Although node 102 is referred to here as the "transmitting" node 102 and the nodes 104 are referred to here as the "receiving" nodes 104, it is to be understood that it is typically the case that each node in such a network 120 acts, at different times, as a transmitting node and a receiving node.

In this example, at least a portion of the data transmitted by the transmitting node 102 is contextual information associated with the transmitting node 102. Such contextual information is derived or obtained from the current state of at least one information source 106. This contextual information is also referred to here as the "state" of the information source 106. The transmitting node 102, in this example, transmits to the receiving nodes 104 over a public communication channel 108.

When a receiving node 104 receives data that purports to be transmitted from the transmitting node 102, the receiving node 104 wishes to determine if the received data was actually transmitted by the transmitting node 102 and to determine that the received data was not modified during transmission (that is, that the received data is the same data transmitted by the transmitting node 102).

In the example shown in FIG. 1, one or more nodes 110 (also referred to here as "opponent" nodes or "opponents") wish to intercept and alter the data transmitted by the transmitting node 102 and deceive the receiving nodes 104 into believing that the altered data is the data transmitted by the transmitting node 102. Such an opponent node 110 also may wish to impersonate the transmitting node 102 so that the receiving nodes 104 are deceived into believing that data transmitted by the opponent node 110 was transmitted by the transmitting node 102.

Also, it may be the case that the transmitting node 102 and one or more of the receiver nodes 104 may not always operate in a collaborative mode. For example, the transmitting node 102 might disavow data that the transmitting node 102 previously transmitted or a receiving node 104 might falsely indicate that data received by that receiving node 104 was transmitted by the transmitting node 102 or incorrectly indicate that the receiving node 104 did not receive data transmitted by the transmitting node 102 when in fact the receiving node 104 successfully received the data.

These issues with transmitting and receiving data in the example shown in FIG. 1 can be addressed using cryptographic techniques. However, in some applications, even if a receiving node 104 is able to determines that data received by that node 104 is the same data transmitted by the transmitting node 102, the receiving node 104 needs a mechanism to determine if the contextual information relating to the state of the information source 106 included in the received data is correct. For example, the transmitting node 102 might intentionally transmit false contextual information about the state of the information source 106 (for example, because the transmitting node 102 has been comprised in some manner). One application of the techniques described below in connection with FIGS. 2A-2B and 3-4 is determining if such contextual information is correct.

Figure 2A:
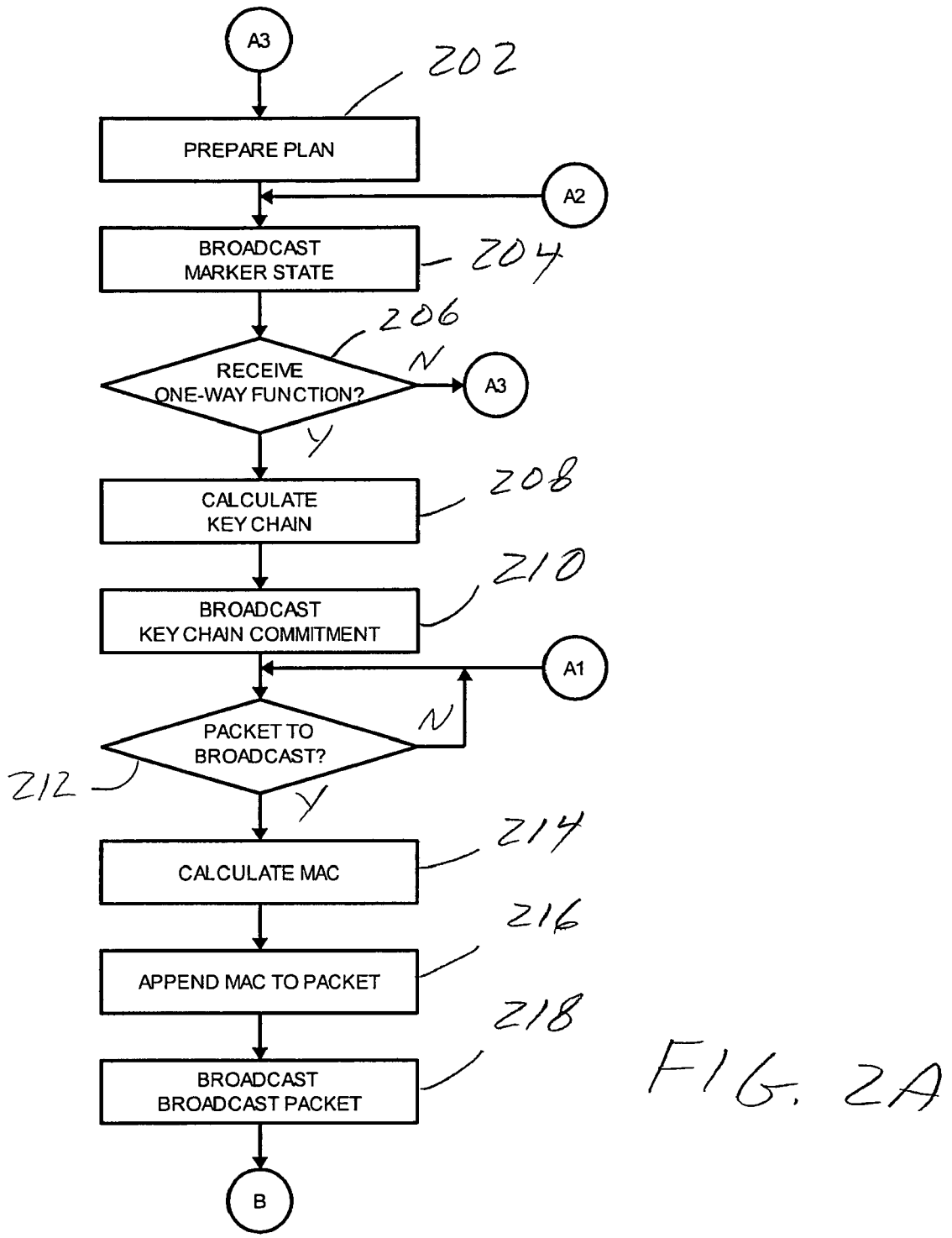
FIGS. 2A-2B and 3-4 are flow diagrams of one embodiment of a property-based data authentication mechanism.
Figure 2B:
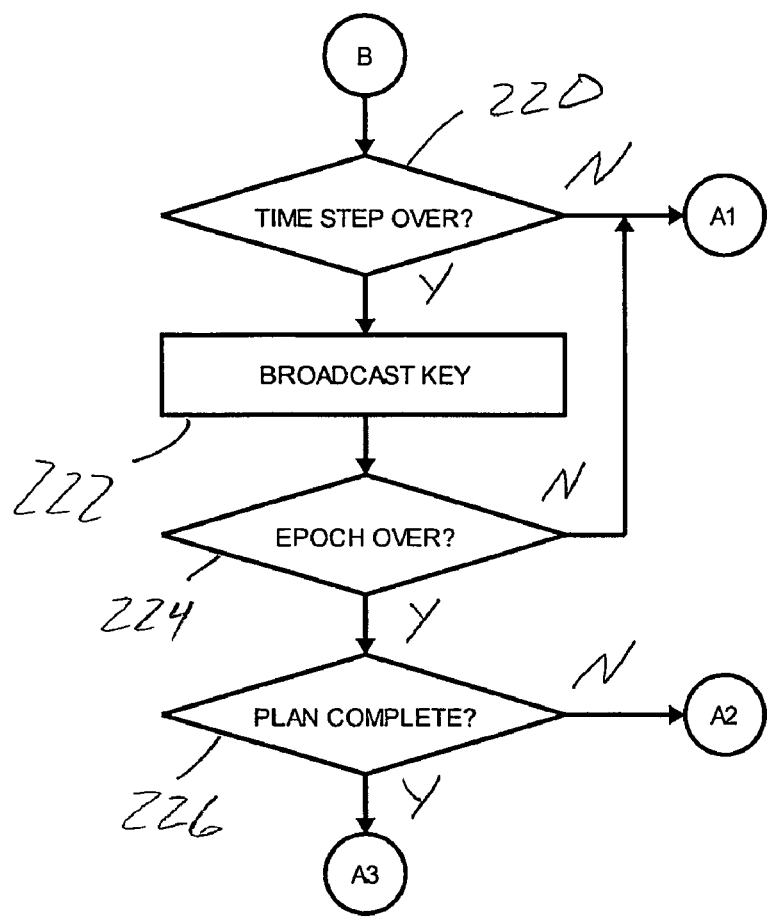
Figure 3:
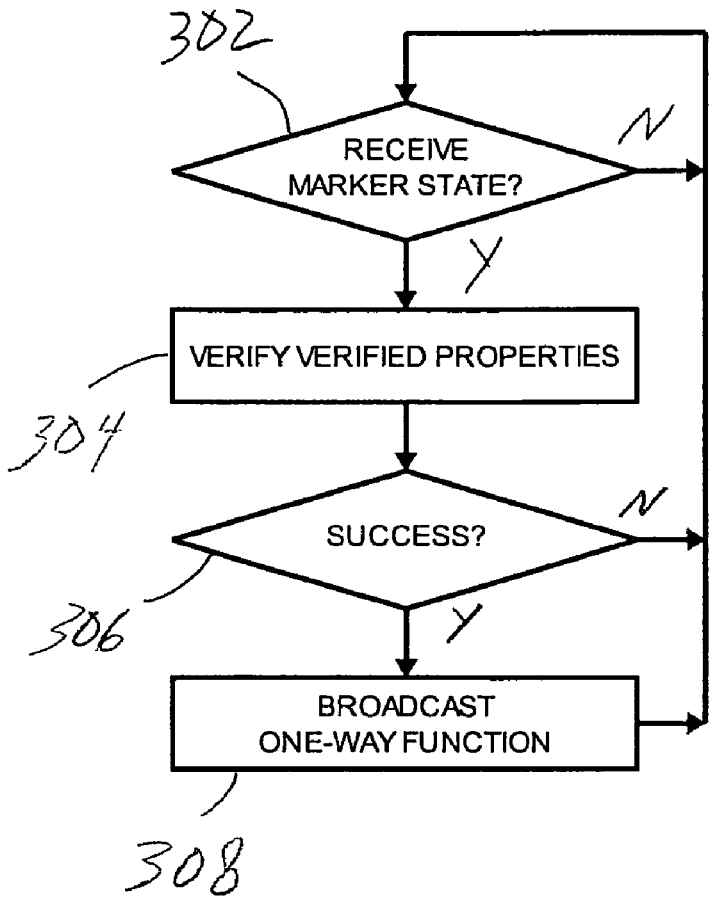
Figure 4:
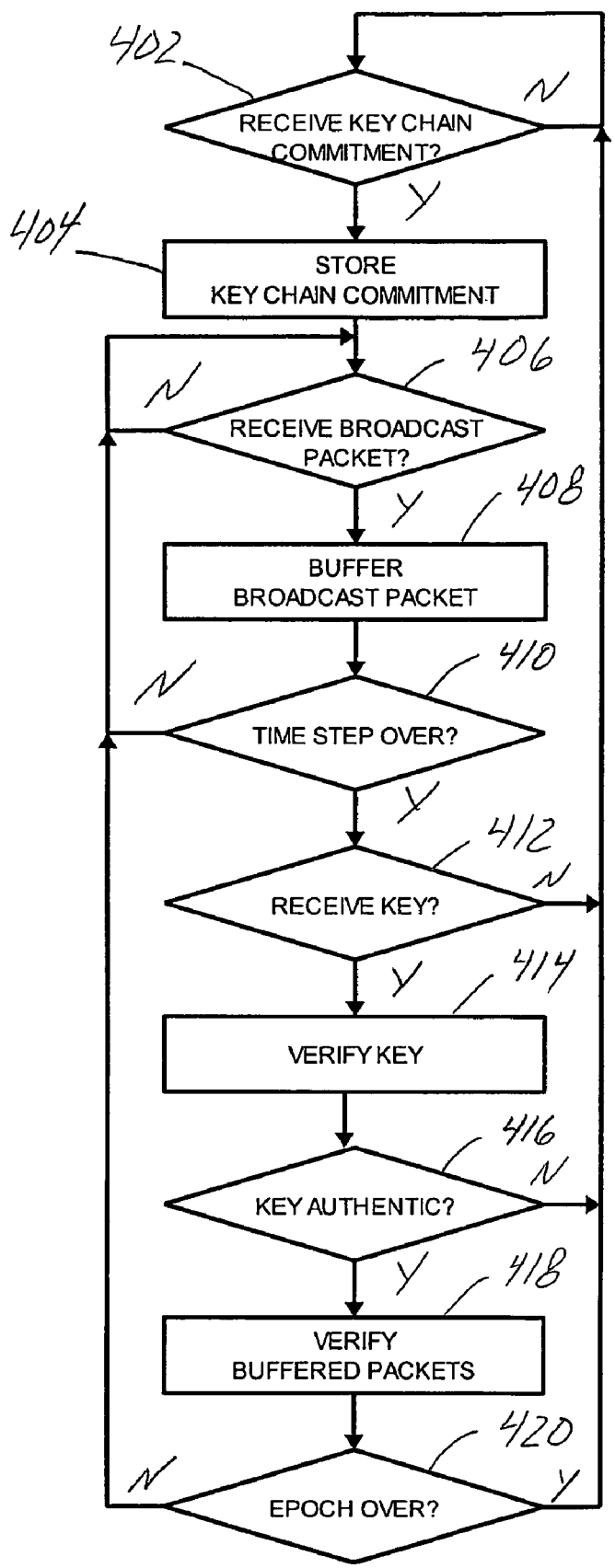

FIGS. 2A-2B and 3-4 are flow diagrams of one embodiment of a property-based data authentication mechanism. The particular embodiment described in connection with FIGS. 2A-2B and 2-4 is described here as being implemented in the context of the system shown in FIG. 1, though it is to be understood that other embodiments are implemented in other ways. In such an embodiment, processing performed by a transmitting node is shown in FIGS. 2A-2B, processing performed by "observer" nodes (as defined below) is shown in FIG. 3, and processing performed by receiver nodes is shown in FIG. 4.

In such an embodiment, the contextual information associated with the transmitting node 102 comprises information about one or more properties of (or otherwise associated with) the information source 106. Formally, the contextual information comprises a set of discrete elements S (also referred to here as the "information set" S). Each element of the information set S is an ordered tuple that takes its elements from one or more other sets. That is, the information set $S=\{s_i, i=0, 1, \ldots, k-1, s_i=\{s_{1i}, s_{2i}, s_{3i}, \ldots\}, s_{1i} \in S_1, s_{2i} \in S_2, s_{3i} \in S_3, \ldots\}$. Each of the sets $S_1, S_2, S_3$, etc. is defined over its respective finite set of symbols and are associated with a respective property. For example, if a set T (also referred to here as the "sensor" set) is a set of values that could be output from a sensor associated with the transmitting node 102 and set L (also referred to here as the "location" set) is a set of locations for the sensor, then the information set S associated with the transmitting node 102 is a subset of the cross-product of the sensor set T and the location set L (that is, $S \subset T \times L$, where $s_i=\{t_i, l_i\}, t_i \in T, l_i \in L$.

In such an embodiment, a "marker state" is a state of the contextual information for a given information source 106 where the value of one or more of the properties (also referred to here as "verified" properties) included in the contextual information at a particular point in time is known before that point in time occurs and where the value of the one or more verified properties can be verified by one or more of the receiving nodes 104. A receiving node 104 that verifies the values of the verified properties for a given marker state is also referred to here as an "observing node" 104 or "observer" 104. Formally, the information set S can also be characterized using a set X that is a combination $X_0, \ldots, X_{k-1}$, where $X_0, \ldots, X_{k-1}$ are discrete random variables taking symbols from the respective sets $S_0, \ldots, S_{k-1}$ with probabilities $P(X=s_i)=P(X_0=s_{0i}, X_1=s_{1i}, \ldots, X_{k-1i})=p_i$. Thus, a marker state is defined as $m_k=\{s_{1k}, \ldots, s_{(k-1)k}\}$, $P(X_j=s_{jk})=1$, for some $j \in \{0, \ldots, k-1\}$, where $X_j=s_{jk}$ is observable to at least one observer node 104.

A "plan" for a given transmitting node 102 is defined as a set of marker states. In the embodiment shown in FIG. 2, each marker state included in a given plan need not have the same verified properties. Formally, a plan Π is defined as $\Pi=\{m_k, t_k\}$, for some $k \in \{0, \ldots, N\}$. A plan-commit-prove framework is employed, in such an embodiment, in order to determine if contextual information transmitted by the transmitting node 102 is correct (that is, if the transmitting node 102 is making a false claim about the state of the information source 106).

As shown in FIG. 2A, the transmitting node 102 prepares a plan (block 202). As noted above, the plan comprises a set of marker states for the information source 106 associated with the transmitting node 102. Formally, the plan is defined as $\Pi=\{m_k, t_k\}$, for some $k \in \{0, \ldots, N\}$. As used herein, an "epoch" k refers to the period of time between two successive marker states $m_{k-1}$ and $m_k$ occurring at times $t_{k-1}$ and $t_k$, respectively. The size of each epoch k is defined as $\Delta t_k=t_k-t_{k-1}$. In this embodiment, each epoch is subdivided into one or more "steps" and the length of each epoch is defined as the number of steps in that epoch. Formally, each step is defined as $$\Delta t \leq \min_{k=0,\ldots,N} \{\Delta t_k\}$$

and the length of epoch k is defined as $$\Delta n_k = \left\lfloor \frac{\Delta t_k}{\Delta t} \right\rfloor.$$

At the beginning of each epoch k, where $k \in \{1, \ldots, N\}$, (that is, at time $t_{k-1}$), the transmitting node 102 broadcasts a marker state $m_{k-1}$ (block 204). As noted above, at least one observer node 104 receives the broadcast marker state $m_{k-1}$ (block 302 of FIG. 3) and verifies one or more verified properties associated with the marker state $m_{k-1}$ (block 304).

If the observer node 104 successfully verifies the marker state $m_{k-1}$ (checked in block 306), the observer node 104 broadcasts a one-way function $f_{k-1}$ for the received marker state $m_{k-1}$ (block 308). If the observer node 104 is not able to verify the marker state $m_{k-1}$, a one-way function is not broadcast for the received marker state (looping back to block 302).

As shown in FIG. 2A, if the transmitting node 102, after broadcasting a marker state $m_{k-1}$, does not receive a one-way function for the marker state $m_{k-1}$ (for example, after a suitable timeout period has elapsed) (checked in block 206), an error is considered to have occurred and processing is terminated for the current plan (looping back to block 202). If the transmitting node 102 receives a one-way function $f_{k-1}$ for the broadcast marker state $m_{k-1}$, the transmitting node 102 calculates a key chain for the current epoch k using the received one-way function (block 208).

Figure 5:
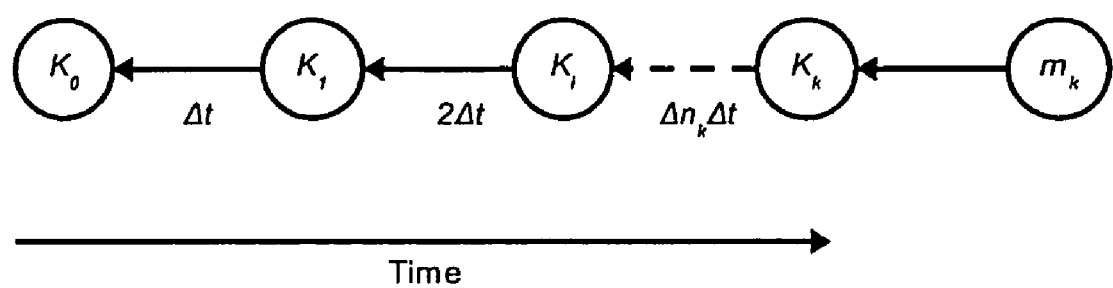
FIG. 5 illustrates one example of a key chain.

One example of a key chain is illustrated in FIG. 5. For an epoch k having an epoch length $\Delta n_k$, the transmitting node 102 calculates a key $K_k$ for the final step in the epoch k (that is, step $\Delta n_k$) by performing the one-way function $f_{k-1}$ on the marker state $m_k$ that occurs at the end of the epoch k. In one implementation of such an embodiment, only those symbols used to specify the one or more verified properties of the marker state $m_k$ are used by the one-way function $f_{k-1}$ to calculate the key $K_k$. Then, for each step i of the epoch k other than the final step $\Delta n_k$, the transmitting node 102 calculates a key $K_i$ for that step i by performing the one-way function $f_{k-1}$ on the key $K_{i+1}$ generated for the following step (that is, for the step i+1). After keys $K_k$ through $K_1$ have been generated, the transmitting node 102 generates a key chain commitment $K_0$ for the key chain by performing the one-way function $f_{k-1}$ on the key $K_1$.

The keys in the key chain satisfy the following relationship $K_0=f^i_{k-1}(K_i)$, where $K_i$ represents the ith key in the key chain. That is, starting from the key $K_i$, the one-way function $f_{k-1}$ is performed i times in order to calculate the key commitment $K_0$ in the following manner. The one-way function $f_{k-1}$ is performed on key $K_i$ to calculate the key $K_{i-1}$. The one-way function $f_{k-1}$ is again performed on the key $K_{i-1}$ in order to calculate the key $K_{i-2}$. This process of evaluating the one-way function $f_{k-1}$ to calculate the previous key in the key chain is repeated i times in order to calculate the key commitment $K_0$. As described below, this relationship is used in the embodiment shown in FIGS. 2A-2B and 3-4 to verify the authenticity of any given key in the key chain.

As shown in FIG. 2A, the transmitting node 102 broadcasts key-chain-commitment information for the current epoch k (block 210). The key-chain-commitment information comprises, in this embodiment, the key chain commitment $K_0$, the time when the current epoch k starts (that is, $t_{k-1}$), the time step $\Delta t$, the number of steps in the current epoch k (that is, $\Delta n_k$), and the one-way function $f_{k-1}$. Formally, the key-chain-commitment information, in such an embodiment, is defined as $\{K_0, t_{k-1}, \Delta t, \Delta n_k, f_{k-1}\}$. As shown in FIG. 4, when a receiving node 102 receives key-chain-commitment information for the current epoch k (block 402), the receiving node 104 stores the received key-chain-commitment information (block 404).

Then, during each time step i of the current epoch k (where i ∈ {1, . . . , $\Delta n_k$}), when the transmitting node 102 wishes to transmit a data packet (checked in block 212 of FIG. 2A), the transmitting node 102 calculates a message authentication code (MAC) for the data packet using key $K_i$ from the key chain that is associated with the time step i (block in 214). The MAC is calculated using an authentication function that is a function of the data packet and the key $K_i$. The authentication function that is selected for use by the transmitting mode 102 (and, as described below, by the receiving nodes 104) is a part of the keyed authentication mechanism for verifying each data packet transmitted by the transmitting node 102. The transmitting node 102 then appends the generated MAC onto the data packet (block 216). The combination of a data packet and a MAC is also referred to here as a "broadcast packet." The transmitting node 102 then broadcasts the resulting broadcast packet (block 218). During each time step i of the current epoch k, when a receiving node 104 receives a broadcast packet broadcast by the transmitting node 102 (block 406 of FIG. 4), the receiving node 104 buffers the received broadcast packet (block 408).

When the time step i is over (checked in block 220 of FIG. 2B), the transmitting node 102 broadcasts the key $K_i$ for the time step i (block 222). After the time step i is over (checked in block 410 of FIG. 4), if a receiving node 104 does not receive the key $K_i$ for the time step i (for example, after a suitable timeout period has elapsed) (checked block 412), an error is considered to have occurred and any buffered broadcast packets received by the receiving node 104 from the transmitting node 102 during the time step i are considered invalid (looping back to block 402). If the receiving node 104 receives a key $K_i$ for the time step i, the receiving node 104 verifies that the received key $K_i$ is authentic (that is, was transmitted by the transmitting node 102) (block 414). Each receiving node 104 verifies the received key $K_i$ by checking if the following relationship is true $K_0 = f^i_{k-1}(K_i)$ for the received key $K_i$. That is, the receiving node 104 evaluates the one-way function $f_{k-1}$ i times in the manner described above in connection with FIG. 5 and checks if the result is equal to the key chain commitment $K_0$.

If received key $K_i$ is not authentic (checked in block 416), the receiving node 104 considers any buffered packets received from the transmitting node 102 during the time step i to be invalid and (looping back to block 402). If received key $K_i$ is authentic, the receiving node 104 verifies, using the received key $K_i$, the authenticity of any broadcast packets buffered by the receiving node 104 during step i (block 418). For example, for each buffered broadcast packet, the receiving node 104 uses the authentication function to calculate a MAC using the key $K_i$ and the data packet from that broadcast packet. The MAC is calculated using the same authentication function used by the transmitting node TX. The MAC calculated by the receiving node 104 is compared to the MAC included in the broadcast packet. If the two MACs match, the receiving node 104 considers that broadcast packet to be authentic (that is, transmitted by the transmitting node 102). If the two MACs do not a match, the receiving node 104 does not consider that broadcast packet to be authentic. If the current epoch k is over (checked in block 420), the receiving node 104 loops back to block 402 of FIG. 4. Otherwise if the current epoch k is not over, the receiving node 104 loops back to block 406 to receive any packets broadcast by the transmitting node 102 during the next time step.

As shown in FIG. 2B, if the current epoch is not over (checked in block 224), the transmitting node 102 loops back to block 212 to broadcast packets (if any) during the next time step using the next key in the key chain. If the current epoch k is over and the plan Π is not complete (checked in block 226 of FIG. 2B), the transmitting node 102 loops back to block 204 and performs the processing for the next epoch. More specifically, the transmitting node 102 broadcasts the next marker state in the plan Π and at least one observer node that receives the broadcast marker state verifies the one or more verified properties of that marker state (as described above in connection with FIG. 3).

When the current plan Π is complete, the transmitting node 102 loops back to block 202 to create a new plan Π (if necessary).

One example of the operation of the embodiment shown in FIGS. 2A-2B and 3-4 is described below in connection with FIGS. 6-8. In this example, such an embodiment is implemented in a wireless network 600 (shown in FIG. 6). It is to be understood, however, that such an embodiment can be implemented in other ways (for example, in other types of wired and/or wireless networks using other types of communication media). The wireless network 600 comprises a plurality of nodes 602, at least a portion of which communicate with one another over a wireless communication medium. In the particular exemplary implementation shown in FIG. 6, at least a portion of the nodes 602 communicate with one another using radio frequency (RF) wireless communication links. In other embodiments and implementations, other types of wireless communication link (for example, infrared wireless communication links) are used instead of or in addition to RF wireless communication links.

In this example, one of the nodes 602 is a transmitting node of the type described above in connection with FIGS. 2A-2B (and is referred to here as transmitting node "TX"). In this example, the transmitting node TX is a wireless sensor node (and, as a result, network 600 is also referred to here as a "wireless sensor network"). The transmitting node TX includes (or is otherwise coupled to) a sensor 606. Each sensor 606 is capable of generating or obtaining sensor data that is indicative of some physical attribute of interest. Each wireless sensor node receives sensor data from a respective sensor 606 included in or otherwise coupled to transmitting node TX. Also, in this example, the transmitting node TX is mobile and moves throughout a predefined area within the network 600. Applications where such an implementation may be suitable included, for example, asset tracking, movement of rail carts, movement of military equipment, locating people, and controlling access to a physical space (for example, a cockpit) based on the location of one or more computational devices.

In this example, the nodes 602 of the network 100 include a set of static nodes 608. Each static node 608 is fixed (that is, does not move during normal operation). As result, each static node 608 has a known wireless coverage area 610. The wireless coverage area 610 is the geographic region in which the static node 608 is able to wirelessly communicate with nodes 602. As a result, if a static node 608 is able to communicate with a given node 602 over a wireless communication link, the static node 608 knows that the node 602 is within the wireless coverage area 610 of that static node 608. In this example, the static nodes 608 are "observer nodes" of the type described above in connection with FIG. 3.

Figure 6:
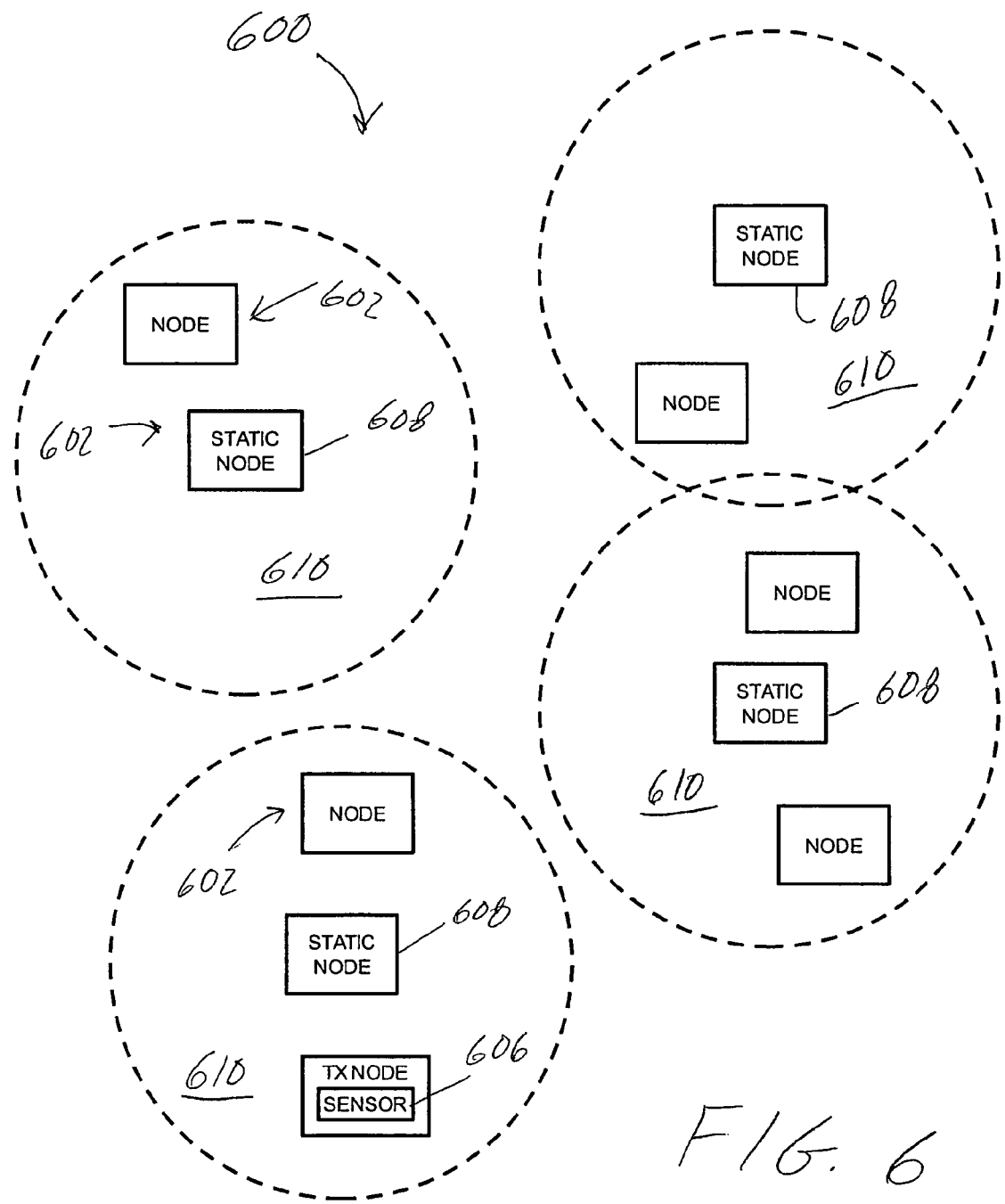
FIG. 6 is a block diagram of one embodiment of a wireless network.
Figure 7:
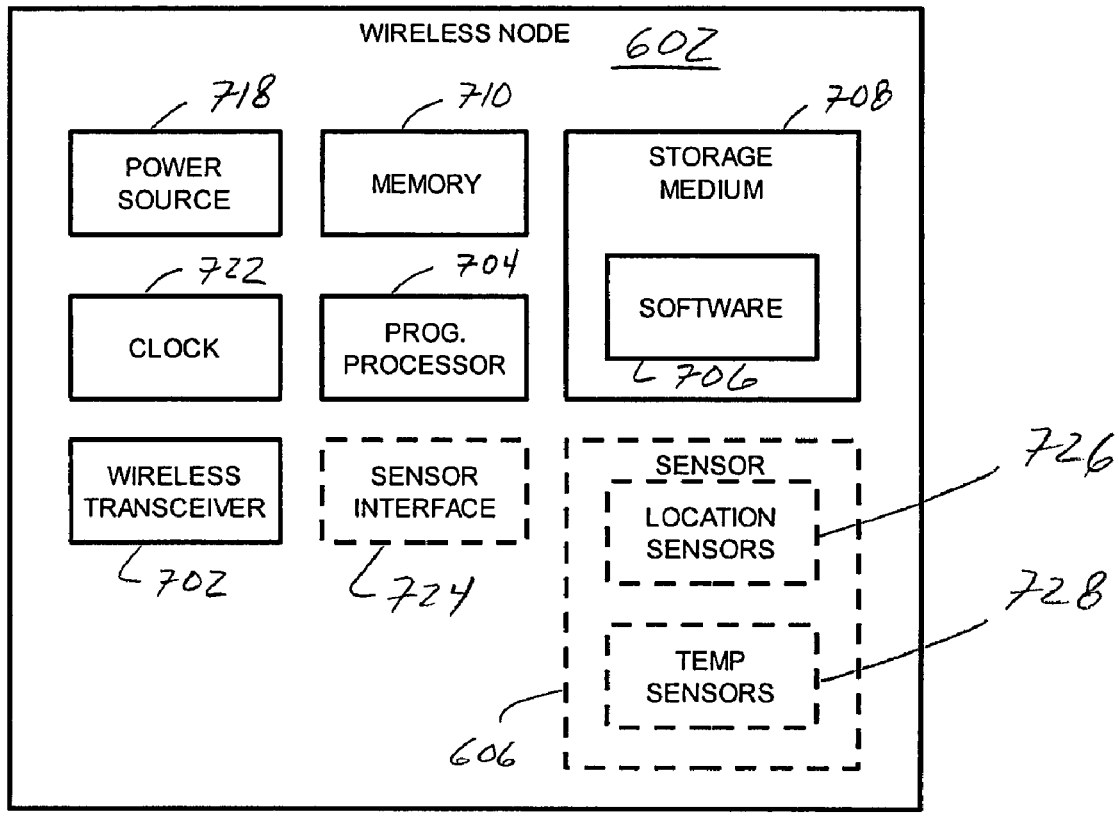
FIG. 7 is a block diagram of one embodiment of a wireless node.
Figure 8:
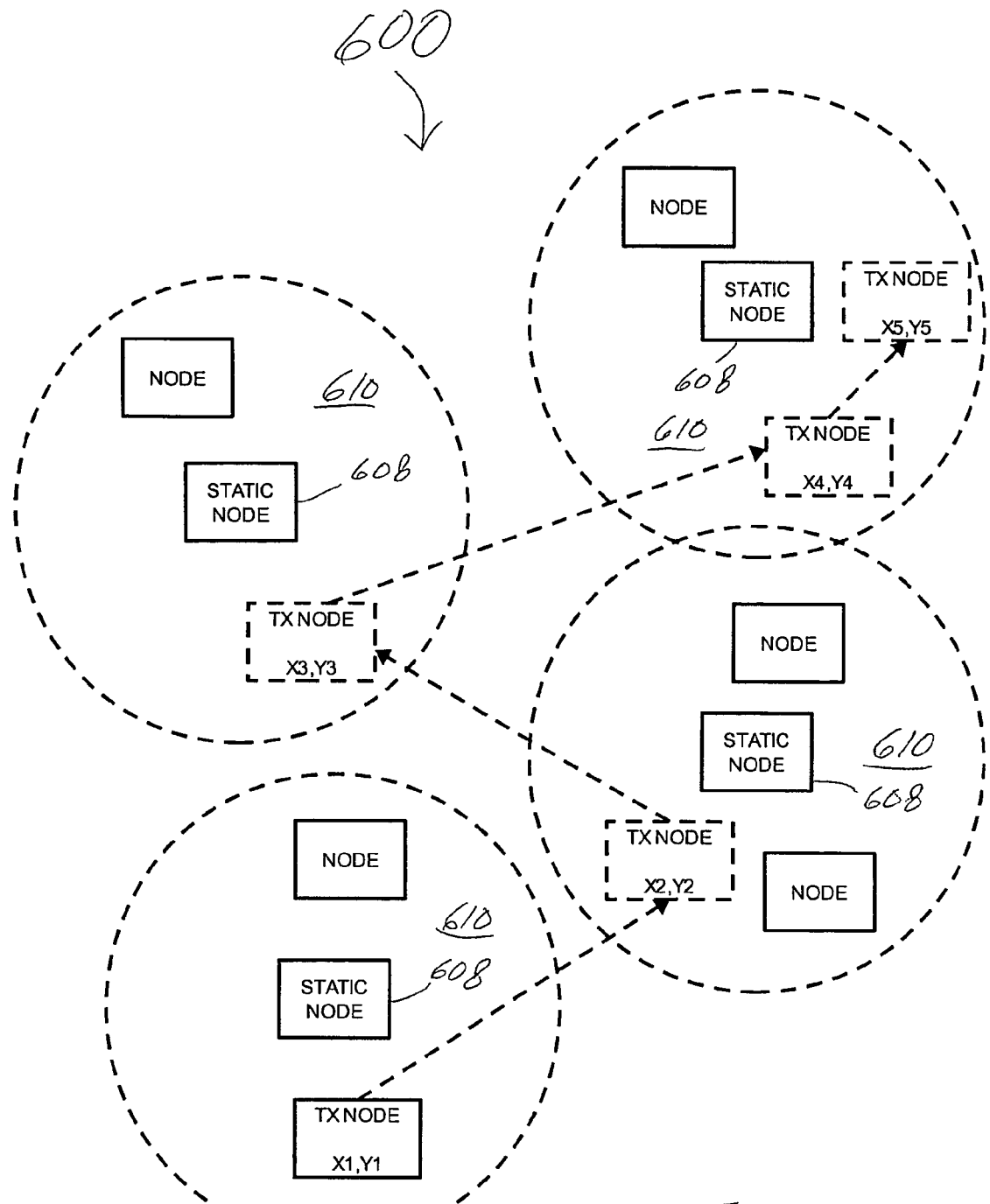
FIG. 8 illustrates one example of the operation of the wireless network of FIG. 6.

FIG. 7 is a block diagram of one embodiment of a wireless node 602. The wireless node 602 shown in FIG. 7 is suitable for use in the embodiment of a wireless network 600 shown in FIG. 6. The wireless node 602 shown in FIG. 7 comprises a wireless transceiver 702 that transmits and receives data over one or more wireless communication links. In one embodiment, the wireless transceiver 702 comprises a RF transceiver that sends and receives data over one or more RF communication links. In other embodiments, the wireless transceiver 702 comprises other types of wireless transceivers for sending and receiving data over other types of wireless communication links (for example, an infrared transceiver for sending and receiving data over infrared communication links) instead of or in addition to an RF transceiver.

The wireless node 602 shown in FIG. 7 further comprises a programmable processor 704 that executes software 706. The software 706 comprises program instructions that, when executed by the programmable processor 704, perform at least a portion of the processing described here as being performed by the wireless node 602. The software 706 is stored (or otherwise embodied) on or in a storage medium 708 (for example, a read-only memory device or flash memory device) from which at least a portion of the software 706 is read by the processor 704 for execution thereby. The wireless node 602 shown in FIG. 7 includes memory 710 in which at least a portion of the software 706 and any data structures used by the software 706 are stored during execution. The memory 710 includes any appropriate type of memory now known or later developed including without limitation, ROM, random access memory (RAM), and a set of registers included within the processor 704.

The wireless node 102 also comprises a power source 718 (for example, a battery and/or an interface for coupling the wireless node 602 to an external power source such as a source of alternating current (AC) power). The wireless node 102 also comprises a clock 722. The clock 722 is used to provide timing information to the various components of the node 602.

The transmitting node TX of FIG. 6 further includes the elements shown in FIG. 7 using dashed lines. The transmitting node TX comprises a sensor interface 724 that couples one or more sensors 606 to the transmitting node TX. In the particular embodiment shown in FIG. 7, the sensors 606 are integrated into the wireless sensor node (for example, by enclosing the sensors 606 within a housing that encloses the sensors 606 along with the other components of the transmitting node TX). In another embodiment, the sensors 606 are not integrated into the transmitting node TX but are otherwise communicatively coupled to the other components of the transmitting node TX via the sensor interface 724.

The sensors 606 generate or otherwise obtain contextual information that is used by the transmitting node TX. In the example shown in FIG. 7, the sensors 606 comprise one or more location sensors 726 that generate or otherwise obtain information that is indicative of the current location of the transmitting node TX. Also, in the example shown in FIG. 7, the sensors comprise a temperature sensor 728 that generates or otherwise obtains information that is indicative of the temperature of the immediate vicinity of the transmitting node TX or the node itself (or a component thereof). In other embodiments and implementations, the transmitting node TX generates or obtains the contextual information in other ways.

The sensor interface 724 comprises appropriate interface hardware or software for communicatively coupling the sensors 606 to the other components of the wireless sensor node. For example, in one embodiment, the sensor interface 724 includes, for example, an analog-to-digital converter and/or a software driver for the sensors 606.

In this example, the mobile transmitting node TX generates a plan $\Pi=\{m_k, t_k\}$, for some $k \in \{0, \ldots, N\}$, where the verified property for each marker state $m_k$ is an x-y location for the mobile transmitting node TX at the respective time $t_k$. That is, $m_k=\{x_k,y_k\}$ for time $t_k$. The plan $\Pi$ is generated so that the x-y coordinates $\{x_k,y_k\}$ for each marker state $m_k$ are within the wireless coverage area 610 of at least one static node 608.

In this example, at the beginning of each epoch k (that is, at time $t_{k-1}$ for that epoch k), the mobile transmitting node TX broadcasts marker state $m_{k-1}$ (as described above in connection with block 204 of FIG. 2A), the mobile transmitting node TX encrypts the maker state $m_{k-1}$ using a shared encryption key that is known to the mobile transmitting node TX and at least the static nodes 608.

At least one static node 608 receives the encrypted marker-state broadcast and decrypts the marker-state broadcast using the shared key. The static node 608 then verifies the x-y coordinates included in the marker-state broadcast. The static node 608 knows the geographic boundary of its wireless coverage area 610 and is able to determine if the x-y coordinates included in the marker-state broadcast are within that wireless coverage area 610. If the x-y coordinates are outside of the geographic boundary of the wireless coverage area 610 for that static node 608, the static node 608 knows that the transmitting node TX cannot be located at the x-y coordinates specified in the marker-state broadcast because the static node 608 was able to receive the broadcast. That is, if the transmitting node TX was actually located at the x-y coordinates specified in the marker-state broadcast, that static node 608 should not have been able to receive the broadcast. In this situation, the static node 608 considers the marker state $m_{k-1}$ to be invalid and does not broadcast a one-way function for the marker state.

If the x-y coordinates included in the marker-state broadcast are within the geographic boundary of the wireless coverage area 610 for that static node 608, the static node 608 considers the x-y coordinates specified in the marker-state broadcast to be valid because the static node 608 was able to receive the broadcast. In this situation, the static node 608 considers the marker state $m_{k-1}$ to be valid and then randomly generates a nonce $N_s$. The static node 608 encrypts the marker state $m_{k-1}$ included in the received marker-state broadcast along with the nonce $N_s$ and broadcasts the resulting encrypted response. The mobile transmitting node TX receives the encrypted response from the static node 608, decrypts the response, and extracts the nonce $N_s$. The mobile transmitting node TX encrypts the extracted nonce $N_s$ using the shared key and broadcasts the encrypted nonce $N_s$. The static node 608 then receives the encrypted nonce $N_s$ broadcast by the transmitting node TX, decrypts the encrypted nonce $N_s$, and checks that the decrypted nonce $N_s$ matches the nonce $N_s$ broadcast by the static node 608 previously. If there is a match, the static node 608 randomly generates a one-way function $f_{k-1}$ for use in the current epoch k and encrypts the one-way function $f_{k-1}$ using the shared key. The static node 608 broadcasts the encrypted one-way function $f_{k-1}$.

The mobile transmitting node TX receives and decrypts the encrypted one-way function $f_{k-1}$ and uses the one-way function $f_{k-1}$ to calculate a key chain for the current epoch k. The mobile transmitting node TX broadcasts key-chain-commitment information for the current epoch k.

Then, during each time step i of the current epoch k, when the mobile transmitting node TX wishes to transmit a data packet, the mobile transmitting node TX calculates a MAC for the data packet using the key $K_i$ from the key chain that is associated with the current time step i. The MAC is calculated using a selected authentication function that is a function of the data packet and the key $K_i$. The MAC is appended to the data packet and the resulting broadcast packet is broadcast by the transmitting node TX. Each node 602 that receives the broadcast packet transmitted by the mobile transmitting node TX buffers the received broadcast packet (as described above in connection with FIG. 4).

When the current time step i is over, the mobile transmitting node TX broadcasts the key $K_i$ for that time step i. Each receiving node 602 that receives the key broadcast $K_i$ verifies the received key $K_i$ by checking if the following relationship is true $K_0 = f^i_{k-1}(K_i)$ for the received key $K_i$. If the received key $K_i$ is not authentic, the transmissions from the mobile transmitting node TX received during that step i are not considered valid. If the received key $K_i$ is authentic, each receiving node 602 verifies the authenticity of any broadcast packets buffered by the receiving node 602 during time step i using the received key $K_i$.

During the current epoch k, the mobile transmitting node TX should have moved from the x-y coordinates specified in the marker state $m_{k-1}$ to the x-y coordinates specified in the marker state $m_k$ in accordance with the plan Π. When the current epoch k is over (that is, at time $t_k$) and the plan Π is not complete, the mobile transmitting node TX (in connection with the processing performed for the next epoch k+1) verifies its current location by broadcasting marker state $m_k$ at the beginning of that epoch k+1 (that is, at time $t_k$). If the mobile transmitting node TX has, in fact, moved to the x-y coordinates specified in the marker state $m_k$ in accordance with the plan Π at least one static node 608 having that x-y coordinate within its wireless coverage area 610 will receive the marker-state broadcast and will be able to verify that fact. The static node 608 will verify that the mobile transmitting node TX is located within the wireless coverage area 610 of that static node 608 and provide a one-way function to the transmitting node TX.

In such an example, the embodiment of the property-based data authentication mechanism described here provides improved data authentication in an efficient manner (for example, efficient in terms of communication cost, message overhead, and storage requirements).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A network comprising:
a plurality of nodes, each of the nodes including a respective transceiver to communicate with other nodes;
wherein a transmitting node included in the plurality of nodes generates a plan comprising a plurality of marker states, each marker state comprising a value for a property associated with the transmitting node, wherein the value for a particular point in time is known to an observer node included in the plurality of nodes before that point in time; and
wherein when the transmitting node broadcasts information indicative of a given marker state included in the plan, the observer node verifies the value of the property included in the given marker state;
wherein each marker state included in the plan is associated with a respective epoch, wherein each epoch comprises a set of time steps;
wherein a receiving node included in the plurality of nodes receives information indicative of at least a key chain commitment and a one-way function for the respective epoch associated with the given marker state;
wherein, for each time step in the respective epoch associated with the given marker state:
during the respective time step:
when the transmitting node is to broadcast a data packet, the transmitting node generates a message authentication code for the data packet using a key that is associated with the respective time step and that is from a key chain associated with the key chain commitment, appends the message authentication code to the data packet to create a broadcast packet comprising the data packet and the media authentication code, and broadcasts the broadcast packet; and
when the receiving node receives the broadcast packet, the node buffers the broadcast packet; and
when the respective time step is over:
the transmitting node broadcasts the key included in the key chain that is associated with the respective time step; and
when the receiving node receives the key included in the key chain that is associated with the respective time step, the node verifies the received key using the one-way function associated with the respective epoch associated with the given marker state and the key chain commitment for the respective epoch associated with the given marker state and, if the received key is successfully verified, the receiving node uses the received key to authenticate broadcast packets buffered by the receiving node during the respective time step.

2. The network of claim 1, wherein when the transmitting node broadcasts the information indicative of the given marker state and if the observer node successfully verifies the value of the property included in the given marker state:
the observer node generates the one-way function and broadcasts information indicative of the generated one-way function; and
the transmitting node receives the information indicative of the generated one-way function and uses the one-way function to generate the key chain, which comprises the key chain commitment for use in authenticating data broadcast by the first node during the epoch associated with the given marker state.

3. The network of claim 1, wherein the key chain comprises a set of keys, wherein each key is associated with a respective time step of the epoch associated with the given marker state.

4. The network of claim 3, wherein the transmitting node broadcasts information indicative of at least the key chain commitment and the one-way function for use in authenticating data broadcast by the transmitting node during the epoch associated with the given marker state.

5. The network of claim 1, wherein the property comprises a location associated with the first node.

6. The network of claim 5, wherein the transmitting node is a mobile node.

7. The network of claim 1, wherein a subset of the nodes comprise wireless nodes.

8. The network of claim 7, wherein a subset of the wireless nodes comprise wireless sensors nodes.

9. The network of claim 1, wherein the transmitting node comprises an asset that is being tracked.

10. A method comprising:
generating a plan for a transmitting node comprising a transceiver, wherein the plan comprises a plurality of marker states, wherein each marker state comprises a value for a property associated with the transmitting node and wherein each marker state is associated with a respective epoch, wherein each epoch comprises a set of steps and wherein the value for a particular point in time is known to at least one observer node before that point in time;
for a given epoch:
broadcasting, from the transmitting node, information indicative of the marker state associated with the given epoch; and
if at least one observer node successfully verifies the value of the property included in the marker state associated with the given epoch:
receiving, at the transmitting node, information indicative of a one-way function generated by the observer node;
generating, using the one-way function and the marker state associated with the given epoch, a key chain comprising a key chain commitment for use in authenticating data broadcast by the transmitting node during the given epoch, wherein the key chain comprises a set of keys, wherein each key is associated with a respective step of the given epoch; and
broadcasting, by the transmitting node, information indicative of at least the key chain commitment and the one-way function for use in authenticating data broadcast by the transmitting node during the given epoch, wherein the information indicative of at least the key chain commitment and the one-way function is received at a receiving node;
during each step in the given epoch, when a data packet is to be broadcast by the transmitting mode: generating a message authentication code for the data packet using the key included in the key chain that is associated with the respective step, appending the message authentication code to the data packet to create a broadcast packet comprising the data packet and the media authentication code, and broadcasting the broadcast packet from the transmitting node, wherein the receiving node buffers any broadcast packets received at the receiving node during the respective step;
when the respective time step is over: broadcasting the key included in the key chain that is associated with the respective step from the transmitting node, wherein the receiving node receives the key included in the key chain that is associated with the respective step, verifying the received key using the one-way function associated with the given epoch and the key chain commitment for the given epoch, and if the received key is successfully verified, authenticating broadcast packets the receiving node has buffered during the respective step using the received key.

11. The method of claim 10, wherein the transmitting node and the observer node are a part of a network.

12. The method of claim 11, wherein the network comprises a wireless network.

13. A method of verifying a marker state when a transmitting node broadcasts information indicative of the marker state, wherein the marker state comprises a value for a property associated with the transmitting node, the method comprising:
receiving, at an observer node comprising a transceiver, the information indicative of the marker state, wherein the value for a particular point in time is known to the observer node before that point in time; and
verifying, at the observer node, the value of the marker state; and
if the value of the marker state is successfully verified, generating, at the observer node, a one-way function and broadcasting, from the observer node, information indicative of the one-way function for use by the transmitting node in generating a key chain;
wherein the transmitting node receives the information indicative of the one-way function generated by the observer node and generates, using the one-way function and the marker state associated with the given epoch, a key chain comprising a key chain commitment for use in authenticating data broadcast by the transmitting node during the given epoch, wherein the key chain comprises a set of keys, wherein each key is associated with a respective step of the given epoch;
wherein the transmitting node broadcasts information indicative of at least the key chain commitment and the one-way function for use in authenticating data broadcast by the transmitting node during the given epoch, wherein the information indicative of at least the key chain commitment and the one-way function is received at a receiving node;
wherein, during each step in the given epoch, when a data packet is to be broadcast by the transmitting mode: the transmitting node generates a message authentication code for the data packet using the key included in the key chain that is associated with the respective step, appends the message authentication code to the data packet to create a broadcast packet comprising the data packet and the media authentication code, and broadcasts the broadcast packet, wherein the receiving node buffers any broadcast packets received at the receiving node during the respective step;
wherein, when each respective time step is over: the transmitting node broadcasts the key included in the key chain that is associated with the respective step and the receiving node receives the key included in the key chain that is associated with the respective step, verifies the received key using the one-way function associated with the given epoch and the key chain commitment for the given epoch, and if the received key is successfully verified, authenticates broadcast packets the receiving node has buffered during the respective step using the received key.

14. The method of claim 13, wherein the information indicative of the marker state is encrypted by the transmitting node using a shared key, wherein the method further comprises decrypting the information indicative of the marker state using the shared key.

15. The method of claim 14, further comprising encrypting the information indicative of the one-way function using the shared key before broadcasting.

16. A node comprising:
a transceiver to communicate with a plurality of other nodes;
wherein the node generates a plan that comprises a plurality of marker states, wherein each marker state comprises a value for a property associated with the node and wherein each marker state is associated with a respective epoch, wherein each epoch comprises a set of steps and wherein the value for a particular point in time is known to at least one observer node before that point in time;
wherein, for a given epoch, the node broadcasts information indicative of the marker state associated with the given epoch; and
wherein, if the at least one observer node included in the plurality of nodes successfully verifies the value of the property included in the marker state associated with the given epoch, the node:
receives information indicative of a one-way function generated by the observer node;
generates, using the one-way function and the marker state associated with the given epoch, a key chain comprising a key chain commitment for use in authenticating data broadcast by the node during the given epoch, wherein the key chain comprises a set of keys, wherein each key is associated with a respective step of the given epoch; and
broadcasts information indicative of at least the key chain commitment and the one-way function for reception by a receiving node to use in authenticating data broadcast by the node during the given epoch;
wherein, during each step in the given epoch, when a data packet is to be broadcast by the node, the node:
generates a message authentication code for the data packet using the key included in the key chain that is associated with the respective step;
appends the message authentication code to the data packet to create a broadcast packet comprising the data packet and the media authentication code; and
broadcasts the broadcast packet, wherein the receiving node buffers any broadcast packets received at the receiving node during the respective step; and
when the respective time step is over, the node broadcasts the key included in the key chain that is associated with the respective step for use by the receiving node in authenticating broadcast packets the receiving node has buffered during the respective step using the key if the receiving node successfully verifies the key using the one-way function associated with the given epoch and the key chain commitment for the given epoch.

17. A node comprising:
a transceiver to communicate with a plurality of other nodes;
wherein, when a transmitting node broadcasts information indicative of a marker state, wherein the marker state comprises a value for a property associated with the transmitting node, wherein the value for a particular point in time is known to the node before that point in time:
the node receives the information indicative of the marker state and verifies the value of the marker state; and
if the value of the marker state is successfully verified, the node generates a one-way function and broadcasts information indicative of the one-way function for use by the transmitting node in generating a key chain comprising a key chain commitment, wherein the transmitting node broadcasts information indicative of at least the key chain commitment and the one-way function for reception by a receiving node to use in authenticating data broadcast by the node during an epoch that is associated with the marker state, wherein the epoch comprises a set of time steps;
wherein, for each time step in the epoch associated with the marker state:
during the respective time step:
when the transmitting node is to broadcast a data packet, the transmitting node generates a message authentication code for the data packet using a key that is associated with the respective time step and that is from a key chain associated with the key chain commitment, appends the message authentication code to the data packet to create a broadcast packet comprising the data packet and the media authentication code, and broadcasts the broadcast packet; and
when the receiving node receives the broadcast packet, the node buffers the broadcast packet; and
when the respective time step is over:
the transmitting node broadcasts the key included in the key chain that is associated with the respective time step; and
when the receiving node receives the key included in the key chain that is associated with the respective time step, the node verifies the received key using the one-way function associated and the key chain commitment and, if the received key is successfully verified, the receiving node uses the received key to authenticate broadcast packets buffered by the receiving node during the respective time step.

18. A node comprising:
means for generating a plan for the node, wherein the plan comprises a plurality of marker states, wherein each marker state comprises a value for a property associated with the node and wherein each marker state is associated with a respective epoch, wherein each epoch comprises a set of steps and wherein the value for a particular point in time is known to at least one observer node before that point in time;
means, for a given epoch, broadcasting information indicative of the marker state associated with the given epoch; and
means for, if at least one observer node successfully verifies the value of the property included in the marker state associated with the given epoch:
receiving information indicative of a one-way function generated by the observer node;
generating, using the one-way function and the marker state associated with the given epoch, a key chain and a key chain commitment for use in authenticating data broadcast by the node during the given epoch, wherein the key chain comprises a set of keys, wherein each key is associated with a respective step of the given epoch; and broadcasting information indicative of at least the key chain commitment and the one-way function for reception by a receiving node to use in authenticating data broadcast by the node during the given epoch;

means for, during each step in the given epoch, when a data packet is to be broadcast by the node:

generating a message authentication code for the data packet using the key included in the key chain that is associated with the respective step;

appending the message authentication code to the data packet to create a broadcast packet comprising the data packet and the media authentication code; and broadcasting the broadcast packet, wherein the receiving node buffers any broadcast packets received at the receiving node during the respective step; and means for, when the respective time step is over, broadcasting the key included in the key chain that is associated with the respective step for use by the receiving node in authenticating broadcast packets the receiving node has buffered during the respective step using the key if the receiving node successfully verifies the key using the one-way function associated with the given epoch and the key chain commitment for the given epoch.

* * * * *